Patented Dec. 7, 1943

2,336,310

UNITED STATES PATENT OFFICE 2,336,310

METHOD OF PREPARING FLEXIBLE CELLULOSE TRIACETATE MATERIALS

John Spence and Sterling S. Sweet, Rochester, N. Y., assignors to Eastman Kodak Company, Rochester, N. Y., a corporation of New Jersey No Drawing. Application January 7, 1941, Serial No. 373,462

3 Claims. (Cl. 106—187)

This invention relates to forming articles from cellulose esters and more particularly to forming flexible cellulose triacetate articles such as sheeting, filaments and molding and extruding compositions.

Heretofore, various types of hydrolyzed cellulose esters have been made into film support, thin sheeting, filaments and molding and extruding materials from acetone solutions. Cellulose triacetate, the unhydrolyzed form of cellulose acetate, however, is not acetone soluble at ordinary temperatures and will, therefore, precipitate from acetone solutions making it practically impossible to form by the usual commercial processes, such products. Cellulose triacetate is, however, soluble in solvents such as methylene chloride with a lower aliphatic alcohol, tetrachlorethane, chloroform, formic acid, acetic acid and methyl formate. Articles made from such solutions of triacetate are, however, too brittle for many uses and while cellulose triacetate is of interest because of its high tensile strength and because the costly hydrolysis step necessary in the production of other types of cellulose esters may be eliminated in its production, its use has been curtailed by the other disadvantages which it possesses.

An object of the invention is a method of forming flexible and/or non-brittle cellulose triacetate articles.

Another object of the invention is a method of forming articles from cellulose triacetate without appreciable loss in tensile strength in the composition.

Still another object of the invention is a method of preparing a cellulose triacetate solution from which an improved sheet, filament, and extruded or molded article may be formed.

In accordance with the invention these and other objects are attained by forming a solution of cellulose triacetate in a solvent, for example, one of those suggested above. Acetone is then added to this solution with vigorous stirring in an amount below but approaching the point at which the cellulose triacetate will precipitate from the solution. To form a sheet, this solution is then coated by any suitable process onto a smooth forming surface and the solvents permitted or caused to evaporate therefrom. The cellulose triacetate sheet thus formed is then stripped from the forming surface. This sheet will vary in flexibility depending upon the amount of acetone added to triacetate solution. Films coated from such solutions containing various concentrations of acetone below the precipitation point for cellulose triacetate have improved flexibility without a disadvantageous loss in tensile strength. If a filament is desired, the cellulose triacetate solution may be forced from spinnerettes and dried in a suitable spinning cabinet. Likewise it is possible to extrude the composition after the solvent content has been reduced somewhat into continuous rods, sheets and tubes which on curing has improvement in physical properties over similar cellulose triacetate articles formed by other methods.

We mean by the term cellulose triacetate a cellulose acetate with an acetyl content of above 43.0%. The method employed to obtain the acetyl content is the modified Eberstadt method described in "Industrial and Engineering Chemistry" vol. 13, page 369, for June 15, 1941. We have found that the critical concentration of acetone, that is, the point at which the ester precipitates from the solution varies with the acetyl percentage. If one uses a concentraiton of acetone very close to this critical precipitation point the solutions increase in viscosity on standing and may eventually gel. We have also found the rate of gelation may be diminished by lowering the temperature at which the solution is stored.

In accordance with another feature of the invention we have found that the products are more reproducible if a filtering operation is performed on the triacetate solution before the addition of acetone. This filtration very markedly reduces the viscosity of the solution and the tendency toward gelation and thereby contributes to the uniformity of the product. It appears that the filtration removes the nuclei of precipitations which would become effective in the course of the acetone addition.

In accordance with still another feature of the invention we have found it desirable for most successful production to add any plasticizer to be incorporated in the triacetate in solution in the acetone.

While we do not wish to be limited to our explanation of the reason why the above described process causes cellulose triacetate articles to be more flexible, we believe that the increase in flexibility is not due to residual solvent since the solvents employed are all very volatile and the flexibility is maintained on curing after several days at raised temperatures. This would indicate that the improvement is due to a change in the fine structure of the article which results from smaller organized regions or crystallites obtained by this method; this interpretation is supported by birefringence measurements.

The following are typical examples of how the invention may be applied in forming articles from cellulose triacetate but are not to be considered as limitations thereof.

*Example 1*

To a filtered methylene chloride-methyl alcohol dope containing 10 parts by weight of cellulose triacetate of an acetyl value of 44.2% and 45 parts of the solvent (methylene chloride-methyl alcohol in the ratio of 90 to 10) there was added increasing amounts of acetone as indicated below in Table I. From each of these solutions, sheets were formed by flowing the solution onto a smooth sheet of glass. The solvents in the solutions were evaporated and the resulting sheets were extra cured for 12 hours at 100° C. To determine their relative increases in flexibility the various sheets were folded until the flexibility limit was reached.

A cellulose triacetate sheet made in a similar manner but not including the acetone addition was also tested for the purpose of comparison.

*Table I*

| Acetone | Folds[1] |
|---|---|
| 0 parts | 3 |
| 15 parts | 5 |
| 20 parts | 10 |
| 25 parts | 10 |
| 30 parts | 11 |
| 35 parts | 12 |
| 40 parts | 11 |
| 45 parts | 12 |
| 50 parts | 6 |

[1] Extra cured 12 hrs. at 100° C.

It is evident from this table that the introduction of 20 to 45 parts of acetone in the solvent for the triacetate increases the flexibility of the sheets, as shown by the fold value test, by some 4 times; and that only 15 parts of acetone increases the flexibility, as thus measured by nearly 2 times. Above 45 parts acetone, this 44.2% tri-ester has approached the acetone compatibility point and the resulting sheet becomes less flexible.

*Example 2*

10 parts of cellulose triacetate of 44.2% acetyl content was placed in solution in a solvent composed of 45 parts of methylene chloride and 5 parts methyl alcohol. The solution was then filtered. 30 parts of acetone to which has been added 1.5 parts of triphenyl phosphate were added to the filtered triacetate solution with vigorous stirring. The solution was then coated on a smooth glass plate and the solvents evaporated therefrom to form a triester sheet. The sheet was then stripped from the plate and extra cured for 12 hours at 100° C.

Table II gives the physical properties of the sheet made by Example 2 contrasted with those obtained without the addition of the acetone and plasticizer.

*Table II*

| Acetone | Breaking load | Elongation | Folds[1] |
|---|---|---|---|
| | *Kgs.* | *Per cent* | |
| 0 part | 23.0 | 17 | 3 |
| 30 parts | 20.2 | 31 | 15 |

[1] Cured 12 hrs. at 100° C.

*Example 3*

The following solution may be formed into filaments suitable for use in textile production. 100 parts of cellulose triacetate of 44.2% acetyl content was placed in solution in 415 parts of methylene chloride and 45 parts methyl alcohol. The solution was then filtered and 250 parts of acetone containing 15 parts triphenyl phosphate were added with vigorous stirring. When spun from a suitable spinning cabinet a triacetate filament of improved flexibility is obtained.

*Example 4*

A solution formed in accordance with Example 1 was evaporated somewhat to form a viscous mass. This was then extruded through a die to form a tube and after curing the tube was found to have a good tensile strength with diminished brittleness.

In addition to triphenyl phosphates other plasticizers such as the related aryl phosphates, the alkyl phthalates, glycol derivatives and sulphonamides may be employed. Specifically triamyl citrate, tributyl phosphate, triacetin, ethyl acetanilide p-toluene sulphonyl amide have been found compatible with cellulose triacetate.

While in the above examples we have employed a cellulose triacetate of 44.2% acetyl content it will be understood that a similar improvement may be made in the flexibility of cellulose triacetate sheets when employing cellulose triacetates with an acetyl content of approximately 43.0 to 44.8%. Particularly good results are obtainable with triacetates within the range of 43.9 to 44.2% acetyl content.

We claim:

1. A film and filament forming solution comprising a non-acetone soluble cellulose triacetate having an acetyl value within the range of 43.0 to 44.2% in a solvent of 45 parts of methylene chloride-methyl alcohol in a ratio of 90 to 10 and acetone in a range of 44 to 100% of the amount of said solvent.

2. A film and filament forming solution comprising a non-acetone soluble cellulose triacetate having an acetyl value of 44.2% in a solvent of 45 parts of methylene chloride-methyl alcohol in a ratio of 90 to 10 and 30 parts of acetone.

3. A film and filament forming solution comprising a non-acetone soluble cellulose triacetate in a solvent mixed with acetone to an amount approximately 44 to 100% of the amount of said solvent, said acetone thereby being present in an amount less than that which causes precipitation of the non-acetone soluble cellulose triacetate out of solution, but in an amount which imparts improved flexibility characteristics to the article formed from this solution.

JOHN SPENCE.
STERLING S. SWEET.